(12) United States Patent
Sircar et al.

(10) Patent No.: US 11,494,540 B1
(45) Date of Patent: Nov. 8, 2022

(54) METHOD, SYSTEM, AND COMPUTER PROGRAM PRODUCT FOR IMPLEMENTING ELECTRONIC DESIGN CLOSURE WITH REDUCTION TECHNIQUES

(71) Applicant: Cadence Design Systems, Inc., San Jose, CA (US)

(72) Inventors: Sourav Kumar Sircar, Noida (IN); Alwin Gupta, Noida (IN); Marc Heyberger, Mandelieu (FR); Manish Bhatia, Ghaziabad (IN); Manish Garg, Gautam Budh Nagar (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/214,716

(22) Filed: Mar. 26, 2021

(51) Int. Cl.
| | | |
|---|---|---|
| *G06F 30/367* | (2020.01) | |
| *G06F 30/373* | (2020.01) | |
| *G06F 30/3312* | (2020.01) | |
| *G06F 30/398* | (2020.01) | |
| *G06F 30/3315* | (2020.01) | |
| *G06F 119/06* | (2020.01) | |
| *G06F 119/12* | (2020.01) | |

(52) U.S. Cl.
CPC .......... *G06F 30/367* (2020.01); *G06F 30/373* (2020.01); *G06F 30/3312* (2020.01); *G06F 30/3315* (2020.01); *G06F 30/398* (2020.01); *G06F 2119/06* (2020.01); *G06F 2119/12* (2020.01)

(58) Field of Classification Search
CPC .. G06F 30/367; G06F 30/373; G06F 30/3312; G06F 30/3315; G06F 30/398; G06F 2119/06; G06F 2119/12

USPC ................... 716/108, 113, 134, 136; 703/16
See application file for complete search history.

(56) References Cited

U.S. PATENT DOCUMENTS

| | | | | |
|---|---|---|---|---|
| 5,127,008 A | * | 6/1992 | Bassett .......... | G01R 31/318583 |
| | | | | 714/724 |
| 5,862,361 A | * | 1/1999 | Jain .................. | G06F 30/33 |
| | | | | 703/16 |
| 5,930,148 A | * | 7/1999 | Bjorksten .......... | G06F 30/3312 |
| | | | | 716/108 |
| 9,710,593 B1 | * | 7/2017 | Keller .............. | G06F 30/398 |
| 11,036,908 B1 | * | 6/2021 | Chingudi .......... | G06F 30/3312 |

(Continued)

OTHER PUBLICATIONS

Pan, M., et al., "Timing Yield Estimation Using Statistical Static Timing Analysis," IEEE, dated 2005.

(Continued)

*Primary Examiner* — Phallaka Kik
(74) *Attorney, Agent, or Firm* — Vista IP Law Group, LLP

(57) ABSTRACT

Disclosed are methods, systems, and articles of manufacture for implementing electronic design closure with reduction techniques. A timing graph and compact timing data for an analysis view of a set of analysis views may be determined for an electronic design. A reduced set of dominant analysis views may be determined based at least in part upon a result of a timing dominance analysis. Timing data may be loaded for at least the reduced set of dominant analysis views; and a design closure task may be performed on the electronic design using at least the timing data and the reduced set of dominance analysis views.

20 Claims, 10 Drawing Sheets

---

202 Determine A Timing Graph & Compact Timing Data for An Analysis View of A Set of Analysis Views

↓

204 Determine A Reduced Set of Dominant Analysis Views based on A Timing Dominance Analysis

↓

206 Load Timing Data for The Reduced Set of Dominant Analysis Views

↓

208 Perform A Design Closure Task with the Loaded Timing Data and the Reduced Set of Dominant Analysis Views

(56) References Cited

U.S. PATENT DOCUMENTS

2005/0066296 A1\* 3/2005 Visweswariah ..... G06F 30/3312
716/108
2014/0189634 A1\* 7/2014 Tsai ...................... G06F 30/327
716/134

OTHER PUBLICATIONS

Li, B., et al., "On Hierarchical Statistical Static Timing Analysis," Technische Universitaet Muenchen, dated May 2017.
Zhang, Li, "Advanced Timing for High-Performance Design and Security of Digital Circuits," dated 2018.
Kahng, A., et al., ""Unobserved Corner" Prediction: Reducing Timing Analysis Effort for Faster Design Convergence in Advanced-Node Design," Univ of Calif San Diego, Copyright 2019.
Kahng, A., "New Game, New Goal Posts: A Recent History of Timing Closure," CSE and ECE Departments, UC San Diego, dated Jun. 2015.
Chen, R., "Timing Analysis and Optimization Techniques for VLSI Circuits," Northwestern University, dated Dec. 2007.
Onaissi, S., "A Fast Approach for Static Timing Analysis Covering All PVT Corners," dated Jun. 2011.
Wang, Z., et al., "Transistor-Level Static Timing Analysis by Piecewise Quadratic Waveform Matching and SC Method," University of Toronto, dated 2003.

\* cited by examiner

METHOD, SYSTEM, AND COMPUTER PROGRAM PRODUCT FOR IMPLEMENTING ELECTRONIC DESIGN CLOSURE WITH REDUCTION TECHNIQUES

BACKGROUND

A semiconductor integrated circuit (IC) has a large number of electronic components, such as transistors, logic gates, diodes, wires, etc., that are fabricated by forming layers of different materials and of different geometric shapes on various regions of a silicon wafer. Many phases of physical design may be performed with computer aided design (CAD) tools or electronic design automation (EDA) systems. To design an integrated circuit, a designer first creates high level behavior descriptions of the IC device using a high-level hardware design language. An EDA system typically receives the high-level behavior description of the IC device and translates this high-level design description into netlists at various levels of abstraction using a computer synthesis process. A netlist describes interconnections of nodes and components on the chip and includes information of circuit primitives such as transistors and diodes, their sizes and interconnections, for example.

An integrated circuit designer may use a set of layout EDA application programs to create a physical integrated circuit design layout from a logical circuit design. The layout EDA application uses geometric shapes of different materials to create the various electrical components on an integrated circuit and to represent electronic and circuit IC components as geometric objects with varying shapes and sizes. After an integrated circuit designer has created an initial integrated circuit layout, the integrated circuit designer then verifies and optimizes the integrated circuit layout using a set of EDA testing and analysis tools.

Modern electronic designs proceed through a series of design implementation tasks prior to manufacturing. These design implementation tasks involve multiple rounds of analyses, simulation, verification, error fixes, optimizations, ECOs (Engineering Change Orders), and design closure or signoff tasks (e.g., timing closure and/or power closure), etc. at various stages of the electronic design implementation cycle. Prior to tapeout, design optimization, design closure, and signoff are performed to ensure that the electronic circuit, when eventually manufactured, will perform as designed.

Due to various variations introduced by the manufacturing and operation conditions/environment of an electronic design (e.g., process variations, voltage variations, temperature variations) as well as multiple operating modes of the electronic design, a conventional closure task usually first determines multiple, single-mode, single-corner (SMSC) analysis view where each SMSC analysis view corresponds to a particular operating mode and a specific corner and performs a single-mode, single-corner timing analysis (e.g., a static timing analysis or STA) on each of the analysis views. The performance of a timing analysis generates a timing graph. Design closure for a modern electronic design usually involve several hundreds of analysis views, and the timing graph generated for each of these analysis views may easily reach one terabyte (TB).

Once the timing analysis is complete for each of the timing analysis views, and the respective timing graph is generated, conventional approaches proceed to the closure task by first loading the timing graphs for all of the analysis views. Nonetheless, the memory required for loading the timing graphs for all of the analysis views is not feasible at all even for modern, state-of-the art computing systems. In an example where a modern electronic design has, for example, 200 timing analysis views, and the timing graph for each timing analysis view has, even in a conservative case, 500 gigabytes (GB), loading 500 GB for each of the 200 timing analysis views into memory requires 100 terabytes (TB) of physical memory which far exceeds the limit of modern, state-of-the-art computing systems.

Conventional approaches thus focus on pruning the total number of timing analysis views to reduce to a reduced number of timing analysis views so that these conventional approaches only work on a smaller subset of timing analysis views and thus do not need to load as much data into memory. For example, conventional approaches may reduce the total number of timing analysis views to 10% to 20% of the original number of views so that these conventional approaches only need to load 500 GB for each of twenty (10% of 200) or forty (20% of 200) to reduce the physical memory requirement to 10 TB (for 10%) or 20 TB (for 20%) for loading the timing graphs into the physical memory. These conventional approaches suffer from drawbacks. More specifically, the accuracy of the closure tasks is degraded because these conventional approaches only accommodated a small fraction of the original number of timing analysis views.

Some other approaches load the timing graphs and then reduce the size of each timing graph to, for example, about 10% of its original size. These approaches then reduce the total number of timing analysis views for a design closure task to, for example, 10% of the original number of timing analysis views by performing, one or more dominance analyses. In the aforementioned example, these other approaches first load all 200 timing graphs, reduce each timing graph to, for example, 50 GB (10% of 500 GB), and thus require 10 TB of physical memory at the end. These latter approaches also suffer from several shortcomings. Firstly, although a 90% reduction in the size of the timing graph appears to be significant, the requirement of 10 TB of total physical memory for merely loading the timing data is nevertheless impractical. Secondly, these latter approaches still incur the cost of loading the original timing graphs (having the size of 500 GB) of the total of 200 views. Therefore, although the design closure will be executed with reduced timing data (e.g., 50 GB for each timing view as 10% of the original 500 GB) and a reduced number of timing analysis views (e.g., 20 views as 10% of the original 200 views), these approaches nevertheless incur the same cost, at least initially during loading of the 200 original timing graphs.

Therefore, there is a need for methods, systems, and computer program products for implementing electronic design closure with reduction techniques in a more accurate, efficient, and/or effective manner as well as to address at least the aforementioned issues and shortcomings.

SUMMARY

Disclosed are method(s), system(s), and article(s) of manufacture for implementing electronic design closure with reduction techniques in one or more embodiments. Some embodiments are directed at a method for implementing electronic design closure with reduction techniques. These embodiments determine a timing graph and compact timing data for an analysis view of a set of analysis views for an electronic design. A reduced set of dominant analysis views may be determined based at least in part upon a result of a timing dominance analysis. Timing data may be loaded for at least the reduced set of dominant analysis views; and a design closure task may be performed on the electronic design using at least the timing data and the reduced set of dominance analysis views.

In some embodiments, an analysis view may be identified for the electronic design, and the timing graph may be for the analysis view at least by performing a timing analysis on the analysis view for determining the timing graph and the compact timing data.

In some of these embodiments, a point of interest may be identified along a timing path in the analysis view. A set of timing data pertaining to the point to interest may be determined from the timing graph; and the set of timing data may be stored into the compact timing data for the analysis view.

In some embodiments, the plurality of analysis views may be identified for the electronic design; and a set of dominance criteria may be determined for the set of analysis views for determining the reduced set of dominant analysis views.

In some of these embodiments, a nested or hierarchical dominance analysis may be performed on the plurality of analysis views based at least in part upon the set of dominance criteria; and a dominant view may be determined from the plurality of analysis views based at least in part upon a result of the nest or hierarchical dominance analysis for determining the reduced set of dominant analysis views.

In some embodiments, a first analysis view and a second analysis view from the set of analysis views, wherein the first has a first violation, and the second analysis view has a second violation for performing the nested or hierarchical dominance analysis. In addition, a determination of whether the first and the second analysis views correspond to a same delay corner may be made.

In some embodiments where the first and the second analysis views are determined to correspond to the same delay corner, a determination of whether first timing data for the first analysis view is worse than second timing data for the point of interest in the second analysis view may be made. The first analysis view may be determined to dominate over the second analysis view when the first timing data is determined to be worse than the second timing data. On the other hand, the second analysis view may be determined to dominate over the first analysis view when the first timing data is determined to be better than the second timing data for the point of interest.

In some of the immediately preceding embodiments, an operating characteristic may be identified for both the first and the second analysis views, where the operating characteristic comprises a primary voltage or a frequency; and a dominant view may be determined between the first and the second analysis views based at least in part upon the operating characteristic.

In some embodiments where the first and the second analysis views are determined not to correspond to the same delay corner, a determination of whether the first and the second analysis views correspond to a same RC (resistance capacitance) time constant may be made for performing the nested or hierarchical dominance analysis. In some of these embodiments, both the first and the second analysis views may be determined to be dominant and added to the reduced set of dominant analysis views.

In some embodiments where the first and the second analysis views are determined to correspond to the same delay corner, a determination of whether a first cell delay pertaining to the point of interest in the first analysis view is worse than a second cell delay in the second analysis view may be made for performing the nested or hierarchical dominance analysis. In addition, the first analysis view may be determined to dominate over the second analysis view when it is determined that the first cell delay is worse than the second cell delay.

In some embodiments where the first and the second analysis views are determined to correspond to the same delay corner, an operating characteristic pertaining to the point of interest may be identified for the first and the second analysis views for performing the nested or hierarchical dominance analysis. In addition, a dominant view may be determined between the first and the second analysis views based at least in part upon the operating characteristic.

Some embodiments are directed at a hardware system that may be invoked to perform any of the methods, processes, or sub-processes disclosed herein. The hardware system may include at least one microprocessor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

Additional and other objects, features, and advantages of the disclosure are described in the Detail Description, figures, and claims.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present disclosures briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
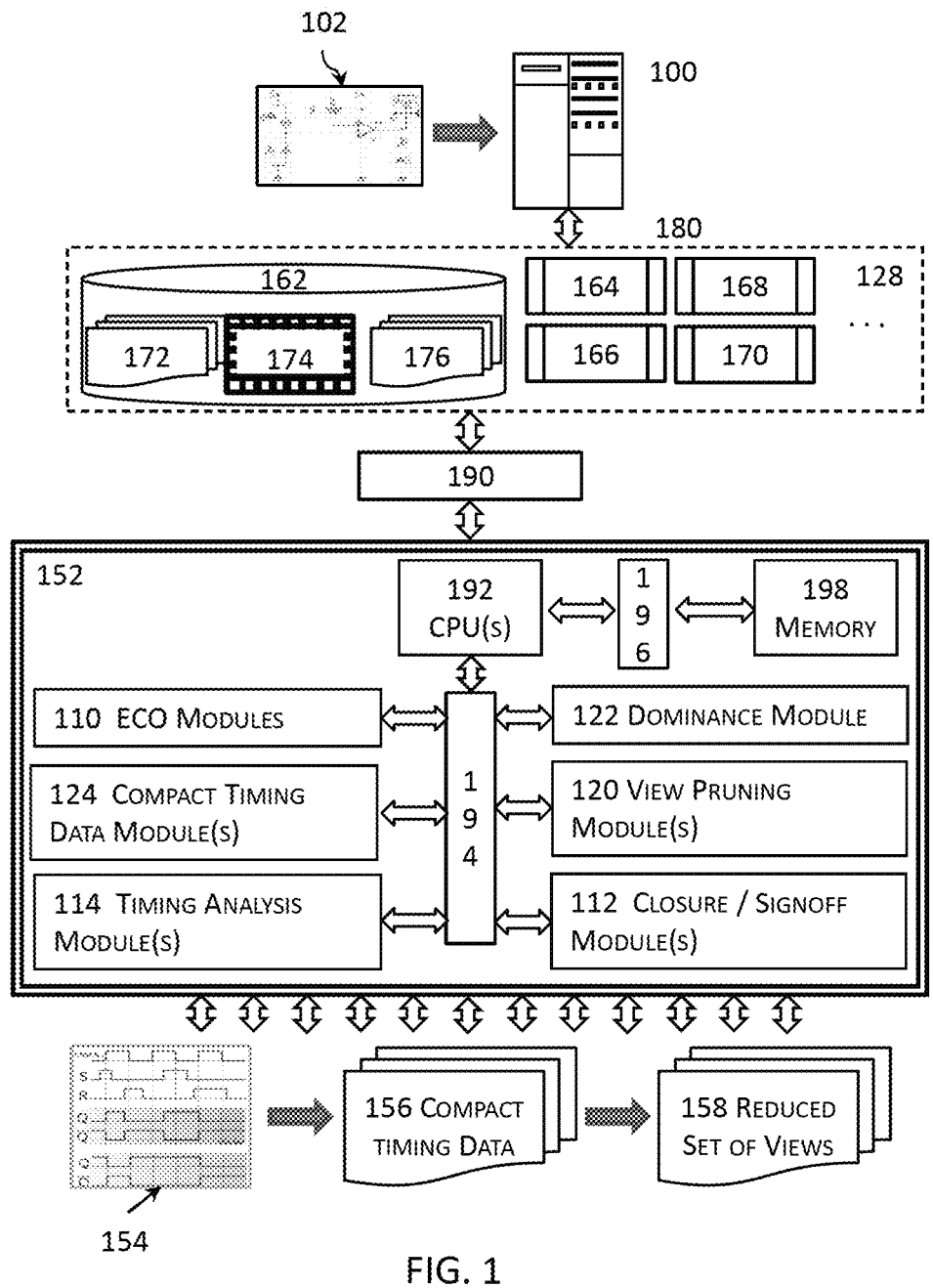
FIG. 1 illustrates a high-level block diagram of a simplified system for implementing electronic design closure with reduction techniques in one or more embodiments.

Various embodiments will now be described in detail with reference to the drawings, which are provided as illustrative examples of the invention so as to enable those skilled in the art to practice the invention. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the invention. Further, various embodiments encompass present and future known equivalents to the components referred to herein by way of illustration.

Further, various embodiments encompass present and future known equivalents to the components referred to herein by way of illustration. It shall be noted that various features and techniques are described hereinafter in terms of embodiments and/or examples. Unless otherwise explicitly described as mutually exclusive, any embodiment, example, feature, and/or characteristic described herein may be readily combined in any suitable manner with any other embodiment, example, feature, and/or characteristic, without departing from the scope or spirit of the present disclosures. All such modifications are intended to be within the scope of claims associated with this disclosure.

In the following description, certain specific details are set forth in order to provide a thorough understanding of various disclosed embodiments. However, one skilled in the relevant art will recognize that embodiments may be practiced without one or more of these specific details, or with other methods, components, etc. In other instances, well-known structures associated with computing systems have not been shown or described in detail to avoid unnecessarily obscuring descriptions of the embodiments.

In addition, unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

It shall be noted that although some examples or embodiments are described herein with reference to connect module, the same techniques may also be provided to other types of objects in an electronic design. Thus, the reference to connect module or connect modules is merely described herein as non-limiting examples.

FIG. 1 illustrates a high-level block diagram of a simplified system for implementing electronic design closure with reduction techniques in one or more embodiments. More specifically, the computing system 100 in FIG. 1 may comprise one or more physical computing systems or virtual machines 100, such as a general-purpose computer described in the System Architecture Overview section to implement one or more special proposes. The illustrative system in FIG. 1 may include an Internet-based computing platform providing a shared pool of configurable computer processing resources (e.g., computer networks, servers, storage, applications, services, a cloud environment, etc.) and data to other computers and devices in a ubiquitous, on-demand basis via the Internet. For example, one or more computing resources and/or modules illustrated in FIG. 1 may be located in a cloud computing platform where computing resources (e.g., storage resources, compute resources, etc.) are provided on an on-demand basis without direct active management by users in some embodiments.

In this system illustrated in FIG. 1, one or more computing systems 100 may invoke and execute various modules to perform a design closure task on an electronic design 102. The one or more computing systems 100 may invoke and execute a plurality of modules 152 that are specifically programmed and stored at least partially in memory of and functions in conjunction with at least one microprocessor (e.g., a central computing unit, a virtualized microprocessor, etc. 192) or processor core of the one or more computing systems 100 to perform various functions to enable a view pruning module or engine (e.g., 120) to, for example, reduce a total number of views to a reduced number of views. For example, a view pruning module or engine (120) may perform a dominance analysis on the original number of timing analysis views to generate a reduced set of timing analysis views (158) that may be further analyzed in a design closure task.

The electronic design 102 may be provided to one or more modules in the plurality of modules 152 which may further execute one or more tasks for implementing an electronic design using connect modules with dynamic and interactive control. For example, a compact timing data module or engine 124 may, either on its own or in conjunction with one or more other modules or engines, determining compact timing data (156) for the electronic design 102 during a timing analysis (e.g., a static timing analysis). Although compact timing data may also be stored in a timing graph in some other embodiments, compact timing data module or engine 124 may store the compact timing data as a side file while the result of the timing analysis is stored as or in a separate timing graph or timing diagram (154) so that only the smaller-sized compact timing data, rather than the much larger timing graph, is loaded for design closure tasks.

Moreover, the one or more computing systems 100 may execute an ECO module (110) that performs one or more engineering change orders on the electronic design (102). The one or more computing systems 100 may also execute one or more timing analysis modules 114 that performs, for example, a timing analysis (e.g., a static timing analysis) on an analysis view of the electronic design (102) to generate a timing graph or timing diagram. As described above, a compact timing data module 124 may also extract and store compact timing data from the timing analysis for subsequent design closure tasks.

The one or more computing systems 100 may execute a dominance module 122 that performs one or more analyses for an electronic design to determine whether a timing analysis view dominates over one or more other timing analysis views. For example, a dominance module 122 may perform a hierarchical or nested dominance analysis having multiple analysis levels on a first timing analysis view and a second timing analysis view of an electronic design to determine whether the first or the second timing analysis view dominates over the other timing analysis view based on a set of dominance criteria such as delay corners, cell delay, RC time constant (the product of resistance and capacitance), clock frequencies, etc.

The plurality of modules 152 may also include a closure or signoff module 112 that performs a design closure task (e.g., a timing closure task, a power closure task, etc.) on the electronic design (102) by using, for example, the compact timing data (156) determined by a compact timing data module 124 and a reduced set of views (158) determined by a view pruning module (120).

The plurality of modules 152 may further include one or more electronic design automation tools (not shown) such as a layout editor for editing a layout, a floor planning tool for generating floorplan(s) for an electronic design, a placement tool for placing circuit component designs into a layout, a routing tool for interconnecting circuit component designs placed by the placement tool or floorplanning tool, a physical verification tool (e.g., a DRC or design rule check tool, an LVS or layout versus schematic tool, an XOR or exclusive tool, an antenna check tool, an ERC or electrical rule check tool, etc.) for ensuring correct electrical and logical functionality and manufacturability, a logic synthesis tool, a clock inserting tool for clock wiring, a post-layout optimization tool for ensuring, for example, performance, noise, signal integrity, and/or yield meets the requirements, a DFM (design for manufacturability) tool to ensure manufacturability of an electronic design by, for example, inserting redundant and/or dummy via(s) and/or metal, diffusion, and/or polysilicon layer(s), an error checking tool for ensuring the mapping to logic is performed correctly, a tapeout and mask generation tool for transforming design data into mask data for photomasks, any other tools pertaining to the physical abstraction of an electronic design, or any combinations thereof. In some embodiments, these one or more electronic design automation tools may be included as one or more corresponding general computing resources in 128.

The plurality of modules 152 may include or at least function in conjunction with a microprocessor 192 (e.g., a central processing unit or CPU) via a system bus 194 to access or invoke various modules in 152 in some embodiments. In these embodiments, a single microprocessor 192 may be included in and thus shared among more than one module even when the computing system 100 includes only one microprocessor 192. A microprocessor 192 may further access some non-transitory memory 198 (e.g., random access memory or RAM) via a data bus 196 to read and/or write data during the microprocessor's execution of processes.

In some embodiments, the one or more computing systems 100 may invoke various system resources such as the processor(s) or processor core(s), memory, disks, etc. The one or more computing systems 100 may also initiate or interact with other computing systems to access, via a computer bus architecture (e.g., a system bus, a control bus, a data bus, or any combinations thereof), various resources 128 that may comprise, for example, a floorplanner, a global routing engine, and/or a detail routing engine 164, a layout editor 166, a design rule checker 168, a verification engine 170, etc.

These various resources 128 may further include, for example, one or more other EDA (electronic design automation) modules such as a schematic tool, a placement tool, a routing tool, verification tools, post-route or post-layout optimization tools, various photolithography tools (e.g., optical proximity correction or OPC tools, phase shift mask or PSM tools, resolution enhancement technology or RET tools, etc.), etc. to prepare the electronic design.

For example, these various resources 128 may further optionally include one or more signoff modules (not shown) to perform various signoff and design closure tasks to ensure that the electronic design implemented by various techniques described herein may be successfully fabricated while maintaining various performance, cost, reliability, and manufacturability requirements.

Strictly as an example, the one or more signoff modules may individually or in conjunction with one or more other modules (e.g., one or more modules in the plurality of modules 152, etc.), power closure related tasks, and/or power analyses to ensure an electronic design meets power, performance, or any other requirements before tapeout. The one or more signoff modules may include one or more signoff parasitic extraction modules to provide silicon-accurate interconnect parasitic extraction and ensure first-pass silicon success, and one or more power signoff modules to perform various power integrity analyses, transistor-level electro-migration and IR-drop analyses, or other power and signal integrity analyses with SPICE-level accuracy or better accuracy with SPICE or SPICE-like simulations (e.g., Fast-SPICE, HSPICE, PSPICE, or any other SPICE-based or SPICE-compatible simulations) to ensure an electronic design meets or exceeds power, performance, and/or area goals in some embodiments.

The one or more signoff modules may include one or more physical verification modules (not shown) to perform various design rule checking, layout vs. schematic (LVS), electrical rule checks (ERC), etc. tasks to ensure that an electronic design meets or exceeds various spatial and other physical rules and one or more design for manufacturing (DFM) modules to address physical signoff and electrical variability optimization, correct lithography hotspots, predict silicon contours, improve yield, detect and repair timing and leakage hotspots to achieve variation- and manufacturing-aware signoff and design closure in some of these embodiments.

In addition or in the alternative, the one or more signoff modules may include one or more one or more computational lithography modules (not shown) to provide more accurate post-etch critical dimension accuracy and process windows on silicon, reticle and wafer synthesis, etc. to eliminate errors and/or reduce mask-manufacturing cycle times. One or more of these signoff modules may operate on the electronic design produced or modified with various techniques to be described in the following sections for proper signoff and design closure so that the signoff version of the electronic design may be properly manufactured with first-pass or fewer passes silicon success in some embodiments. In these embodiments, the signoff version of the electronic design produced or modified with various techniques described herein causes the underlying electronic circuit to be manufactured by a foundry or IC (integrated circuit) fabrication facility when the signoff version of the electronic design is forwarded to the foundry or IC fabrication facility that in turn fabricates the requisite photomasks and the eventual electronic circuit.

Once sign-off and/or design closure is achieved, the electronic design is finalized for tapeout; and the electronic design is transmitted to mask fabrication equipment for mask preparation and mask writing to produce photomasks that are then used in the actual manufacturing of the electronic circuits represented by the electronic design.

The one or more computing systems 100 may further write to and read from a local or remote (e.g., networked storage device(s), virtualized storage resource(s), etc.) non-transitory computer accessible storage 162 that stores thereupon data or information such as, but not limited to, one or more databases (174) such as schematic design database(s) or physical design database(s), electronic circuit design specification database(s), techfiles (or technology files) for multiple manufacturing processes for fabricating an underlying electronic design, various statistics, various data, rule decks, various design rules, constraints, etc. (172), or other pertinent information or data (176) that may be used to facilitate the performance of various functions described herein.

In some embodiments, the computing system 100 may include the various resources 128 such that these various resources may be invoked from within the computing system via a network or a computer bus 190 (e.g., an internet session, an intranet session, a data bus 196 interfacing a physical or virtual microprocessor 192 and the non-transitory computer accessible storage medium 198 (e.g., memory) or a system bus 194 between a microprocessor 192 and one or more engines or modules in the various resources 128). In some other embodiments, some or all of these various resources may be located remotely from the computing system 100 such that the computing system may access the some or all of these resources via a computer bus 190 and one or more network components.

In some embodiments, the computing system 100 may include the various resources 128 such that these various resources may be invoked from within the computing system via a system bus 194 (e.g., a data bus interfacing a microprocessor 192 and the non-transitory computer accessible storage medium 198 or a computer bus 190 between a microprocessor 192 and one or more engines in the various resources 128). In some other embodiments, some or all of these various resources may be located remotely from the computing system 100 such that a computing system 100 may access the some or all of these resources via a computer bus and/or one or more network components.

Figure 2:
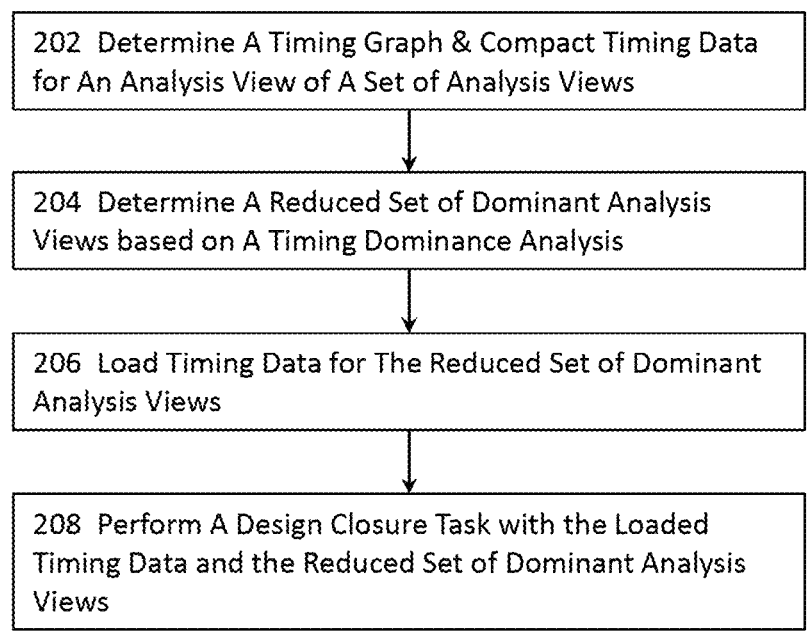
FIG. 2 illustrates a high-level flow diagram for implementing electronic design closure with reduction techniques in one or more embodiments.

FIG. 2 illustrates a high-level flow diagram for implementing electronic design closure with reduction techniques in one or more embodiments. In these embodiments illustrated in FIG. 2, a timing graph and compact timing data may be determined at 202 for an analysis view of a set of analysis views of an electronic design. The manufacturing and operation of the electronic design introduces variations such as process variations, voltage variations, temperature variations, etc., each of which may be referred to as a corner for the electronic design.

In some embodiments, a corner may include, for example, a set of libraries that is characterized for process, voltage, and temperature variations to capture variations in the manufacturing process(es) along with expected variations in the voltage and temperature of the environment in which the electronic circuit being manufactured will operate. A mode, on the other hand, includes an operating mode that may be defined by, for example, a set of clocks, supply voltages, timing constraints, and/or libraries and may even include annotation data (e.g., SDF or parasitics data) in some embodiments. A mode may thus include a combination of, for example, voltage settings, temperature settings, and any other pertinent settings that are used during the timing analysis of the underlying electronic design in some embodiments.

A timing analysis view may thus be constructed for each operating mode and each corner; and the electronic design may thus correspond to a plurality of timing analysis views. In some embodiments, the timing graph and compact timing data may be determined by performing a single-mode, single-corner timing analysis (e.g., a static timing analysis) on a timing analysis view.

The timing analysis determines, for example, timing delays along timing paths in the electronic design and reports the timing against timing constraints and identifies whether the electronic design will operate functionally based at least in part upon the timing characteristics. The results of the timing analysis performed on a timing analysis view may be referenced as a timing graph or timing diagram.

A timing analysis may thus generate a timing graph that includes timing data such as, without limitation, arrival times, required times, transition, etc. for each node along a timing path in the electronic design and thus has a large size often in the range of several hundred gigabytes (GB) to over one terabytes (TB). In some embodiments, compact timing data may be determined from the timing analysis by identifying certain timing data at specific points of interest in the electronic design. For example, compact timing data may include specific timing data at the endpoints along various timing paths in the electronic design. Timing data at points other than endpoints may also be captured as a part of compact timing data in some embodiments. For example, timing data at a start point of a specific timing path may also be captured in the compact timing data in some embodiments.

In some embodiments, the specific timing data captured at these specific points of interest may include, for example, setup slack, normalized slacks (e.g., setup slack), hold slack, driver violating terms and slacks, delay table for select buffer(s), operating voltages of a power domain, and/or one or more clock frequencies, etc. More details about determining a timing graph and compact timing data will be described below with reference to FIG. 3A.

With the timing graphs and compact timing data determined at 202, a reduced set of dominant analysis views may be determined at 204. In some embodiments, the original set of analysis views may be reduced into the reduced set of dominant views by performing one or more dominance analyses at 204. In these embodiments, the original set of analysis views is effectively pruned to a smaller number of analysis views. More details about determining a reduced set of dominant analysis views will be described below with reference to FIG. 3B.

With the reduced set of dominant analysis views determined at 204, timing data may be loaded at 206 for a subsequent design closure task; and the design closure task may be performed at 208 in a multi-mode, multi-corner manner using at least the loaded timing data and the reduced set of dominant analysis Views. A multi-mode, multi-corner analysis allows an electronic design to be analyzed under a variety of operating conditions and variations while performing a timing analysis on the design in some embodiments.

In some embodiments, a design closure task may be performed at 208 only with the reduced set of dominant analysis views, but not the entire set of analysis views, whereas some other embodiments may load the entire set of analysis views. Regarding the timing data loaded at 206, some embodiments load the timing graph only for each analysis view in the reduced set of analysis views and only the compact timing data for the remaining views in the entire set of analysis views when the design closure utilizes the entire set of analysis views. In these embodiments, more detailed timing graphs are loaded for the analysis views that have been determined to be dominant over the remaining analysis views, and the less detailed compact timing data is loaded for an analysis view, if any, that is dominated by another dominant analysis view.

Some other embodiments may load the timing graphs, which include much more detailed timing data, for each view in the reduced set of analysis views or in the entire set of analysis views, depending on whether the entire set of views or the reduced set of views is used. Yet some other embodiments may load only the compact timing data for each view in the reduced set of analysis views or in the entire set of analysis views, depending on whether the entire set of views or the reduced set of views is used. The most computational resource conserving combination is to perform a design closure task with only the reduced set of analysis views and only the compact timing data for each of the reduced set of analysis views. Various techniques thus provide different combinations of analysis views (e.g., a reduced set or an entire set) and types of timing data (e.g., timing graphs or compact timing data) to cope with, for example, different stages at which design closure tasks are performed. For example, during a design closure task performed prior to physical implementation, a more compact combination (e.g., a reduced set of analysis views with compact timing data) may be adopted, where as another design closure task during signoff may adopt the combination of the entire set of analysis views, timing graphs for each of the reduced of analysis views, and compact timing data for the remaining view(s) in the entire set of analysis views other than the reduced set of analysis views.

Timing closure includes a process by which a logic design consisting of primitive elements such as combinatorial logic gates (AND, OR, NOT, NAND, NOR, etc.) and sequential logic gates (e.g., flip flops, latches, memories) is modified to meet its timing requirements. Timing closure may be performed before, during, or after the physical implementation (e.g., placement, routing, etc.) of an electronic design, although physical implementation of an electronic design may alter the timing behaviors of the underlying circuit due to, for example, the introduction and/or modification of interconnects, insertions of circuit components (e.g., buffers, registers, etc.) for correcting timing violations, to eliminate critical path(s), and/or for improving performance of the underlying circuit, etc. Timing closure performed at 208 may thus include the invocation and execution of timing-aware physical implementation modules in some embodiments such as a timing-aware placement module, a timing-aware routing module, etc. so that the physical implementation is performed with awareness of the timing constraints to reduce or eliminate timing violations resulting from the physical implementation.

In some embodiments, the timing closure task, when executed, may analyze and improve and/or optimize the RTL (register transfer level) design to identify and correct design rule violations, to reduce logic levels to reduce possible influence on the time required and the quality of timing closure due to excessive logic levels. In addition or in the alternative, high fan-out nets may be reduced to reduce resource congestion that may increase the path criticality and thus complicate timing closure.

Figure 3A:
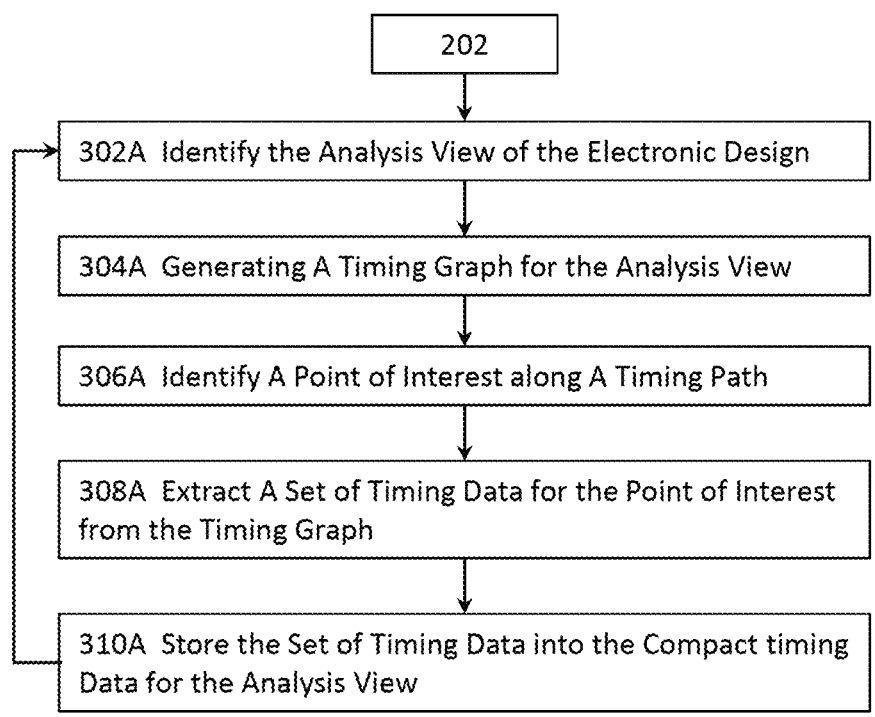
FIG. 3A illustrates more details about a portion of the high-level flow diagram illustrated in FIG. 2 in one or more embodiments.

FIG. 3A illustrates more details about a portion of the high-level flow diagram illustrated in FIG. 2 in one or more embodiments. In these one or more embodiments, an analysis view of the electronic design may be identified at 302A. As described above, an electronic design may correspond to multiple operating modes (e.g., a variety of operating conditions) as well as process variations arising from the manufacturing of the underlying electronic circuit by a foundry. In some embodiments, an analysis view is generated for a combination of one or more operating conditions (e.g., one or more temperature settings, voltage settings, etc.) as well as one or more process variations. In these embodiments, an electronic design often corresponds to several hundreds of analysis views with respective operating modes and variations. In some embodiments, the analysis view may be identified at 302A from a plurality of analysis views for the electronic design.

With the analysis view identified at 302A, a timing graph may be generated for the analysis view at 304A. For example, a timing analysis may be performed to break down the electronic design into one or more sets of timing paths, constrains the one or more sets of timing paths with corresponding constraints, and compute the signal propagation delays for each timing path in the one or more sets of timing paths from the start point of the timing path to the end point of the timing path. The timing analysis may then compare the computed propagation delay against a constraint for the timing path or a portion thereof. The intermediate and/or final comparison results may be stored in a data object such as a timing graph.

A point of interest along a timing path may be identified at 306A. It shall be noted that the point of interest may be identified at 306A before, during, or after the generation of a timing graph at 304A. A point or node of interest along a timing path may include, for example, the end point along the timing path in some embodiments. For the ease of illustration and explanation, the following description refers to an end point or end points although it shall be noted that other types of points or nodes such as a start point or any internal node between the start point and the end point may also be identified as the point of interest at 306A.

An electronic design may include a plurality of different types of timing paths. For example, the plurality of different types of timing paths may include a data path type, a clock path type, a clock gating path type, an asynchronous path type, etc. For a timing path of a data path type, an end point may include a data input pin of a sequential logic gate (e.g., a flip-flop, a latch, a memory or sequential cell, etc.), and/or an output port of a timing path, etc. in some embodiments. A start point may include an input port of a timing path, and/or a clock pin of a sequential logic gate (e.g., a flip-flop, a latch, a memory or sequential cell, etc.) in some embodiments.

For a timing path of a clock path type, a start point may include, for example, a clock input port, and an end point of a timing path may include, for example, a clock pin of a sequential logic gate (e.g., a flip-flop, a latch, a memory or sequential cell, etc.) For a timing path of a gating path type, a start point may include an input port of the electronic design, and an end point may include an input port of the clock-gating element in some embodiments. For a timing path of an asynchronous path type, a start point may include, for example, an input port of the electronic design, and an end point may include the set, clear, or clear pin of a sequential logic gate (e.g., a flip-flop, a latch, a memory or sequential cell, etc.) in some embodiments. It shall be noted that a point of interest along a timing path may be identified at 306A before, while, or after the timing graph is being generated at 304A.

A set of timing data may then be extracted at 308A for the point of interest identified at 306A. The set of timing data may be extracted while the timing graph is being generated or after the timing graph has been generated at 304A. In some embodiments, the set of timing data may be extracted from the timing graph for the analysis view. The set of timing data may include timing data such as, without limitation, setup slack for the identified point of interest, normalized setup slack, hold slack, driver violating terms and slacks, delay table for one or more buffers, one or more operating conditions such as voltages of a power domain, one or more clock frequencies, or any other data related to timing and the point of interest.

This set of timing data may be populated into the compact timing data structure at 310A. In some embodiments, the compact timing data may be stored as a side file along with the timing graph, and both the compact timing data and the timing graph are associated with or linked to the analysis view based on which the timing graph and the compact timing data are generated. In some of these embodiments, the compact timing data and/or the timing graph may be further correlated with the specific mode and the specific corner for which the analysis view is generated.

In various embodiments, timing closure tasks described herein require load only the compact timing graph, rather than the timing graph, for all or a selected subset of analysis views. Moreover, various benchmark tests have demonstrated a reduction of about two orders of magnitude between a timing graph and the corresponding compact timing data for electronic designs having one to about ten million instances for 5 nm to 28 nm technology nodes. In the aforementioned example where a timing graph has on average 500 GB (gigabytes), the aforementioned techniques generate compact timing data having about 50 GB. With these techniques, even loading all 200 analysis views will require only one terabyte (TB) which is more than feasible and practical for average computing systems. This drastic reduction in the timing data for design closure tasks has significantly reduced the consumption (in both loading data for the design closure tasks and in subsequent analyses) of computing resources (e.g., memory footprint, processor cycles, etc.)

Figure 3B:
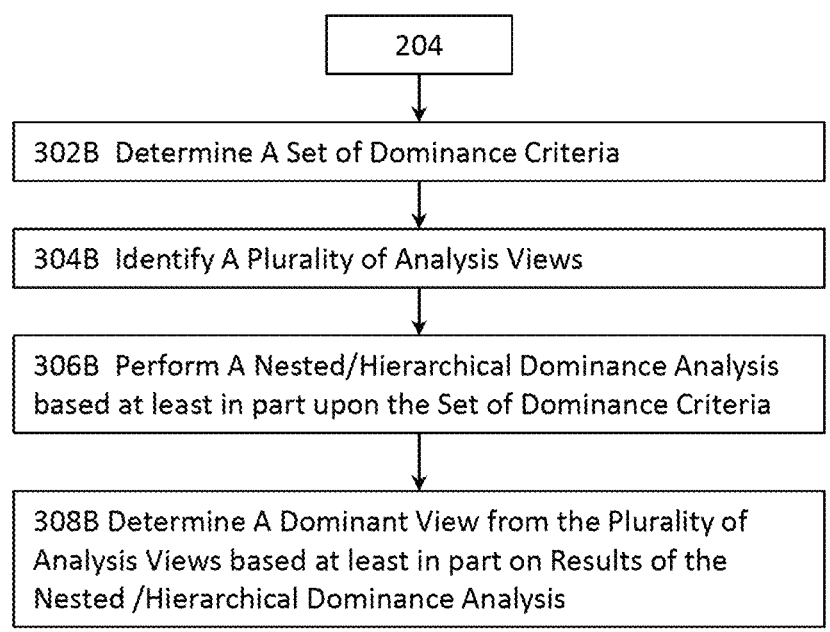
FIG. 3B illustrates more details about another portion of FIG. 2 for implementing electronic design closure with reduction techniques in one or more embodiments.

FIG. 3B illustrates more details about another portion of FIG. 2 for implementing electronic design closure with reduction techniques in one or more embodiments. More specifically, FIG. 3B illustrates more details about determining a reduced set of dominant analysis views at 204 of FIG. 2. In these one or more embodiments, a set of one or more dominance criteria may be determined at 302B. The set of one or more dominance criteria may include, for example, at least one of the delay corner of a circuit component (e.g., an end point of a timing path), the cell delay of a circuit component, RC (resistance capacitance) data of a circuit component, one or more operating characteristics or conditions such as a primary voltage, or a clock frequency, etc.

With the set of one or more dominance criteria determined at 3028, a plurality of analysis may be identified at 304B. As described above, a design closure task may be a multi-mode, multi-corner analysis. The combination of multiple operating modes and multiple corners often yields at least hundreds of single-mode, single-corner analysis views for a modern electronic design. In some embodiments, all single-mode, single-corner analysis views may be identified in the entirety at 304B. The techniques describe herein with reference to FIGS. 3B-3C provide a more effective, efficient methodology to reduce the total number of analysis views without compromising accuracy.

A nested or hierarchical dominance analysis is performed at 306B based at least in part upon the set of one or more dominance criteria determined at 302A. A nested or hierarchical dominance analysis includes multiple levels of analysis, determination, and filtering to select in certain analysis views or filter out certain other analysis views for subsequent design closure task. These multiple levels of analysis, determination, and filtering identify dominant analysis views while accommodating both accuracy and resource consumption at the same time to conserve computing resources without compromising accuracy. In some embodiments, a nested or hierarchical dominance may be performed with the compact timing data for each of the entire set of analysis views to reduce the memory requirement. More details about a nested or hierarchical dominance analysis are described below with reference to FIG. 3C below.

One or more dominant views may be determined at 308B from the plurality of analysis views identified at 304B based at least in part upon the results of the nested or hierarchical dominance analysis. A nested or hierarchical dominance analysis identifies multiple analysis views and information or data therefor, analyzes the multiple analysis views and the information or data, and determines one or more analysis views that are considered dominant over one or more other analysis views. A dominant analysis view will be placed in the reduced set of analysis views, whereas an analysis view that is dominated by another analysis view will not be placed in the reduced set of analysis views for subsequent analyses.

Figure 3C:
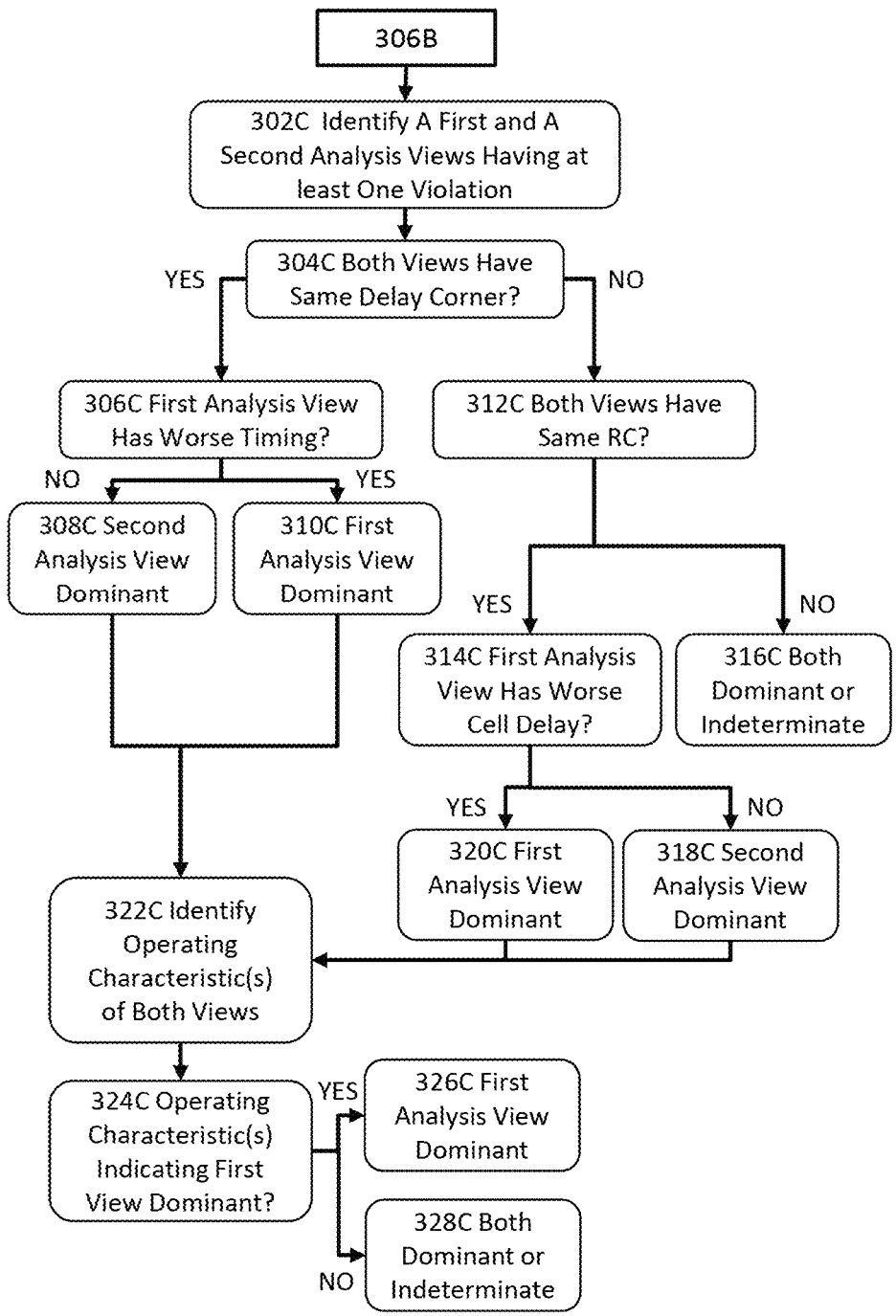
FIG. 3C illustrates more details about a portion of FIG. 2B for implementing electronic design closure with reduction techniques in one or more embodiments.

FIG. 3C illustrates more details about a portion of FIG. 2B for implementing electronic design closure with reduction techniques in one or more embodiments. More specifically, FIG. 3C illustrates an example nested or hierarchical dominance analysis (306B) based on a set of dominance criteria. The example process described with reference to FIG. 3C depicts a simplified nested or hierarchical dominance analysis that determines whether one analysis view dominates over the other analysis view based on some example dominance criteria although it shall be noted that other dominance criteria and/or one or more additional or fewer levels than the example process illustrated in FIG. 3C may also be utilized to determine dominant analysis views.

In these one or more embodiments, a first analysis and a second analysis view may be identified at 302C. Each of the first and the second analysis views may have a timing violation at a point of interest (e.g., an end point of a timing path). In some rare embodiments where an analysis view exhibits no timing violations, this analysis view may be prevented from being added to the reduced set of analysis views. The following sub-processes determine whether the first, the second, or both the first and the second analysis views are to be added to the reduced set of analysis views.

At 304C, the nested or hierarchical dominance analysis may determine whether both the first and the second analysis views correspond to the same delay corner. A delay corner corresponds to a process variation of the manufacturing process of the underlying electronic circuit. Therefore, two analysis views are considered to correspond to the same delay corner when these two analysis views are generated with respect to the same process variation.

If both the first and the second analysis views are determined to correspond to the same delay corner at 304C, the nested or hierarchical dominance analysis further determines whether the timing data (e.g., the slack value at an end point) in the first analysis view is worse than that in the second analysis view at 306C. If the determination at 306C is affirmative (e.g., the slack value at the end point in the first analysis view is worse than that of the second analysis view), the nested or hierarchical dominance analysis may determine that the first analysis view dominates over the second analysis view at 308C and terminate the process in some embodiments.

In these embodiments, the second analysis view may be added to the reduced set of analysis views for subsequent design closure task(s), and the first analysis view may be discarded from the reduced set of analysis views. The reason that the second analysis view (having worse-performing timing data) is determined to dominate over the first analysis view (having better-performing timing data) is that a fix that resolves the timing violation in the second analysis view may also resolve the timing violation in the first analysis view when both analysis views correspond to the same delay corner because the timing performance in the first view is worse than that of the second analysis view.

On the other hand, if the determination at 306C is affirmative (e.g., the slack value at the end point in the first analysis view is worse than that of the second analysis view), the nested or hierarchical dominance analysis may determine that the first analysis view dominates over the second analysis view at 310C and terminate the process in some embodiments.

In these embodiments, the first analysis view may be added to the reduced set of analysis views for subsequent design closure task(s), and the second analysis view may be discarded from the reduced set of analysis views. The reason that the first analysis view (having worse-performing timing data) is determined to dominate over the second analysis view (having better-performing timing data) is that a fix that resolves the timing violation in the first analysis view may also resolve the timing violation in the second analysis view when both analysis views correspond to the same delay corner because the timing performance in the first view is worse than that of the second analysis view. This may conclude the portion of the nested or hierarchical dominance analysis that determines that both the first and the second analysis views correspond to the same delay corner at 304C in some embodiments.

In some other embodiments, the nested or hierarchical analysis may further optionally perform one or more operating characteristic checks even after it has already determined that the first analysis view dominates (310C), or that the second analysis view dominates (308C) by further optionally identifying one or more respective operating characteristics of the first and the second analysis views at 322C. More details about the subprocess at 322C are described below.

In some embodiments where the nested or hierarchical dominance analysis determines that the first and the second analysis views correspond to different delay corners (e.g., the first and the second analysis views are generated after different process variations) at 304C ("NO" for 304C in FIG. 3C), the nested or hierarchical dominance analysis may further determine whether both the first and the second analysis views have the same RC time constant (the product of resistance and capacitance) at 312C. The RC time constant is the product of the resistance and capacitance and has the unit of seconds (when the resistance has the unit of ohms, and the capacitance has the unit of farads). The RC time constant represents the time required to charge the capacitor through the resistor from an initial voltage of zero volt to $1-e^{-1}$ (approximately 0.632) of an applied DC (direct current) voltage or to discharge the capacitor through the resistor to approximately $e^{-1}$ of its initial voltage. The signal delay of a circuit may be dominated by resistive-capacitive effects (e.g., RC) and may be scaled as the square of the wire length because both the resistance and capacitance are proportional to the length of wires. Therefore, when a point of interest (e.g., an end point of a timing path) has the same RC time constant in the first analysis view as the same point of interest in the second analysis view, these two points of interest may be determined to be operating under the same load.

If it is determined at 312C that both the first and the second analysis views do not have the same RC time constant, the nested or hierarchical dominance analysis may determine that both the first and the second analysis views are dominant views at 316C or in the alternative, determine that the analysis result is indeterminate and further proceed with, for example, one or more operating characteristic checks starting at 322C at the next hierarchical level (arrowhead leading from 316C to 322C not shown in FIG. 3C).

On the other hand, if the determination at 312C is affirmative (e.g., both analysis views have the same RC time constant), the nested or hierarchical dominance analysis may further determine whether the cell delay corresponding to the identified point of interest (e.g., an end point) in the first analysis view is worse than the cell delay of the second analysis view at 314C. A cell delay represents the amount of delay from the input to the output of a logic gate in a timing path in some embodiments. In some of these embodiments, the cell delay may be determined from, for example, a delay table provided in the library for the cell of interest and may comprise, for example, one or more process variations and/or one or more RC variations.

If the determination at 314C is negative (e.g., the cell delay in the first analysis view is better than that of the second analysis view), the nested or hierarchical dominance analysis may determine at 318C that the second analysis view dominates over the first analysis view in some embodiments. In these embodiments, the second analysis view, but not the first analysis view, may be added to the reduced set of analysis views for subsequent closure tasks.

On the other hand, if it is determined that the cell delay in the first analysis view is worse than that in the second analysis view at 314C, the nested or hierarchical dominance analysis may either determine that the first analysis view dominates over the second analysis view at 320C in some embodiments.

In some embodiments where the nested or hierarchical dominance analysis has already determined a dominant view at 318C or 320C, the nested or hierarchical dominance analysis may further optionally proceed to the next hierarchical level to perform one or more operating characteristic checks that start with identifying one or more respective operating characteristics for both the first and the second analysis views at 322C.

Some example operating characteristics may include, without limitation, at least one of the primary voltage, one or more clock frequencies (e.g., the fastest clock frequency), etc. of the first analysis view and that of the second analysis view. It shall be noted that some embodiments may identify more than one operating characteristic, and that the nested or hierarchical dominance analysis may add a corresponding level of analysis for each of the operating characteristics.

With the one or more operating characteristics optionally identified at 322C, the nested or hierarchical dominance analysis may further determine whether an operating characteristic indicates that the first analysis view dominates over the second analysis view at 324C. In an example where a first primary voltage and a primary voltage are respectively identified for the first and the second analysis views at 322C as an operating characteristic, the nested or hierarchical dominance analysis may conclude that the analysis view corresponding to the larger primary voltage dominates the other analysis view corresponding to the smaller primary voltage if the analysis view also exhibits worse cell delay because the delay in the analysis view may be determined to always bound the delay in the other analysis view.

Therefore, when both the first and the second analysis views do not have the same delay corner (304C) but have the same RC time constant (312), the nested or hierarchical dominance analysis may determine that the first analysis view dominates over the second analysis view at 326C if an operating characteristic indicates that the first analysis view is dominant or the delay in the first analysis view bounds that in the second analysis view at 324C.

On the other hand, when both the first and the second analysis views do not have the same delay corner (304C) but have the same RC time constant (312), if the one or more operating characteristics cannot deterministically indicate that the first analysis view having worse cell delay dominates over the second analysis view at 324C, the nested or hierarchical dominance analysis may determine that both the first and the second analysis views are dominant at 328C so that both analysis views may be added to the reduced set of analysis views for subsequent design closure task(s) in some embodiments. In some other embodiments when the nested or hierarchical dominance analysis cannot deterministically determine that one analysis view dominates over another analysis view, one of the analysis views may be selected (e.g., from the results of 312C or 314C) and added to the reduced set of analysis views.

The same subprocesses of 322C through 328C may also apply to the embodiments where both analysis views correspond to the same delay corner (304C) where the nested or hierarchical dominance analysis has determined a dominant view from the first and the second analysis views at 308C or 310C. Moreover, the same subprocesses of 322C through 328C may further apply to the embodiments where the first and the second analysis views correspond to different delay corners (304C) and do not have the same RC time constant where the nested or hierarchical dominance analysis arrived at an indeterminate determination at 316C.

Figure 4A:
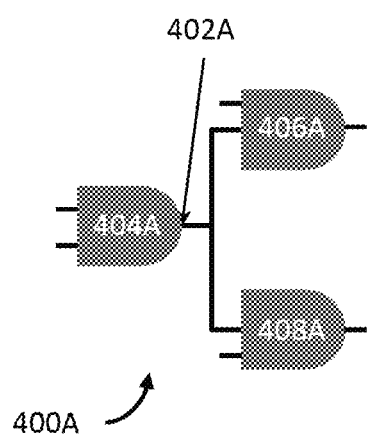
FIGS. 4A-4D illustrate some examples of implementing electronic design closure with reduction techniques in one or more embodiments.

FIGS. 4A-4D illustrate some examples of implementing electronic design closure with reduction techniques in one or more embodiments. FIG. 4A illustrates a simplified example circuit 400A having three circuit components where 402A represents the identified point of interest. In a first example, the simplified example circuit 400A has a plurality of analysis views [V1, V2, V3, . . . ]. Furthermore, assuming analysis view V1 corresponds to delay corner 1 (DC1); and analysis view V2 also corresponds to delay corner 1 (DC1); analysis view V3 corresponds to delay corner 2 (DC2).

Figure 4B:
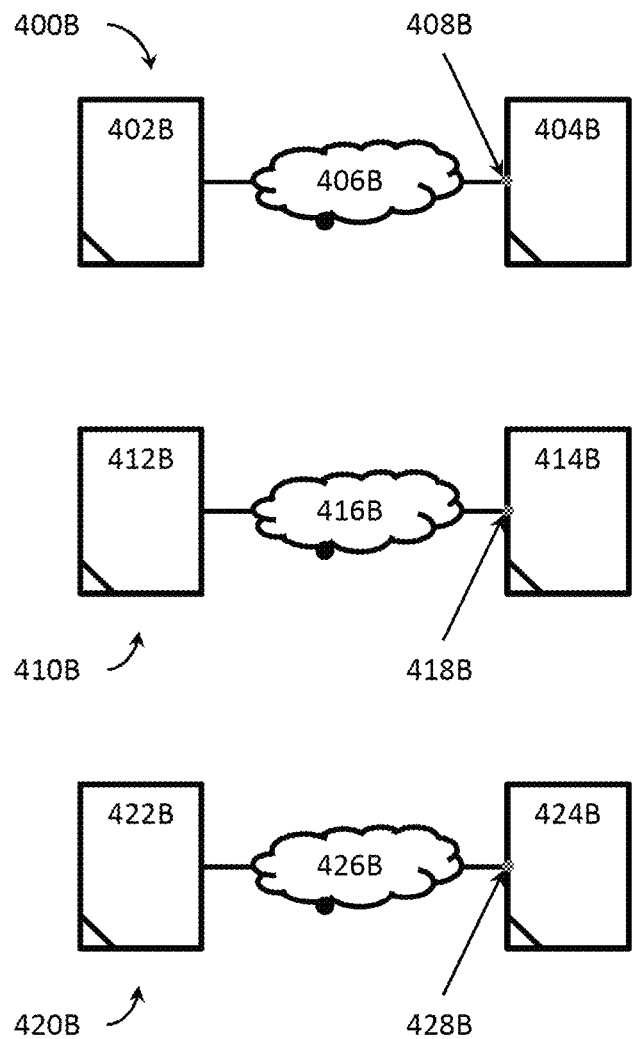

FIG. 4B illustrates three simplified analysis views—the first analysis view 400B, the second analysis view 410B, and the third analysis view, and the third analysis view 420B. These three analysis views may be respectively generated to correspond to different modes and/different corners for the same devices. The first analysis view 400B includes a first device 402B connected to a second device 404B via a combinational logic 406B. The second analysis view 410B includes a first device 412B connected to a second device 414B via a combinational logic 416B. The third analysis view 420B includes a first device 422B connected to a second device 424B via a combinational logic 426B. The respective point of interest for these three analysis views are 408B, 4118B, and 428B.

By using the techniques described herein, a nested or hierarchical dominance analysis may determine which analysis view dominates over another analysis view. For example, the nested or hierarchical dominance analysis may identify the first analysis view V1 400B and the second analysis view V2 410B and determine that the first and the second analysis views correspond to the same delay corner DC1. The nested or hierarchical dominance analysis may then identify the analysis view that has worse timing data at the point of interest (408B OR 418B) as the dominant view. For example, if the nested or hierarchical dominance analysis determines that the slack at 408B in the first analysis view V1 400B is worse than that in the second analysis view V2 410B, the nested or hierarchical dominance analysis may determine that the first analysis view 400B dominates over the second analysis view 410B.

In some embodiments where each of the first and the second analysis views has multiple violations (e.g., a first violation and a second violation in each view), and where the first violation in the first analysis view 400B is worse than that in the second analysis view 410B, but the second violation in the first analysis view 400B is better than that in the second analysis view 410B, the nested or hierarchical dominance analysis may either reach an indeterminate determination and proceed with one or more additional analyses or determine that both the first and the second analysis views are dominant views and are to be added to the reduced set of analysis views.

In some other embodiments where the nested or hierarchical dominance analysis identifies multiple analysis views that do not all correspond to the same delay corners, the nested or hierarchical dominance analysis may perform one or more additional analyses to determine a dominant view. For example, the nested or hierarchical dominance analysis may identify the first analysis view V1 400B corresponding to the first delay corner DC1 and the third analysis view V3 420B corresponding to the second delay corner DC2 that is different from DC1. With these two analysis views corresponding to different delay corners (e.g., different process variations and/or different RC variations), the nested or hierarchical dominance analysis may determine whether these two analysis views correspond to the same RC time constant with respect to the point of interest (e.g., 408B or 428B).

If the determination is affirmative, the nested or hierarchical dominance analysis may then determine the analysis view that corresponds to a worse cell delay as dominating over the other analysis view. For example, if the nested or hierarchical dominance analysis determines that the cell delay at 408B in the first analysis view V1 400B is worse than that in the third analysis view V3 420B, the nested or hierarchical dominance analysis may determine that the first analysis view V1 400B dominates over the third analysis view V3 420B.

In addition or in the alternative, the nested or hierarchical dominance analysis may further identify an operating characteristic such as the first primary voltage in the first analysis view V1 400B and the second primary voltage in the third analysis view V3 420B. If the first primary voltage is determined to be smaller than the second primary voltage, the nested or hierarchical dominance analysis may determine that the first analysis view V1 400B does not dominate over the third analysis view V3 420B, regardless of the previous determination that the first analysis view V1 400B dominates over the third analysis V3 420B. In some of these embodiments, the nested or hierarchical dominance analysis may determine that both the first analysis view V1 4008 and the third analysis view V3 420B are dominant analysis views and may be added to the reduced set of analysis views for subsequent design closure tasks.

One of the reasons that the nested or hierarchical dominance analysis determines that the first analysis view V1 400B does not dominate over the third analysis view V3 420B is that the first primary voltage (e.g., 650 mV) is less than and thus does not cover the second primary voltage (e.g., 1V). Therefore, even if the first analysis view V1 400B corresponds to a worse cell delay than the third analysis view V3 420B, the delays in the first analysis view V1 400B may not necessarily bound the delays in the third analysis view V3 420B. In some of these embodiments, the nested or hierarchical dominance analysis may further perform one or more additional analyses based on, for example, one or more additional operating characteristics (e.g., clock frequencies) to determine whether the first or the third analysis view dominates over the other analysis view. In the alternative, the nested or hierarchical dominance analysis may determine that both the first and the third analysis views are dominant views.

Figure 4C:
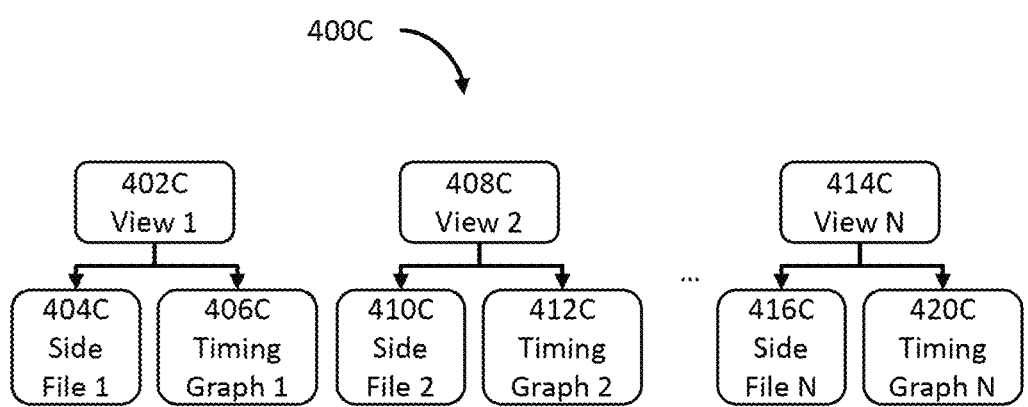

FIG. 4C illustrates a simplified example showing the correlation between an analysis view and the result of performing a timing analysis on the analysis view. As described above, a timing analysis engine (e.g., a static timing analysis engine) may generate a plurality of analysis views (e.g., 402C, 408C, 414C, etc.) for an electronic design based at least in part upon a plurality of operating modes and/or a plurality of corners. The timing analysis engine may then perform a single-mode, single-corner timing analysis on each of the plurality of analysis views and generate the respective timing graphs (e.g., 406C, 412C, 420C, etc.) Moreover, respective compact timing data (e.g., 404C, 410C, 416C, etc.) may also be generated. The compact timing data may be stored as a separate file or data object in some embodiments and may be correlated with the corresponding timing graphs.

Figure 4D:
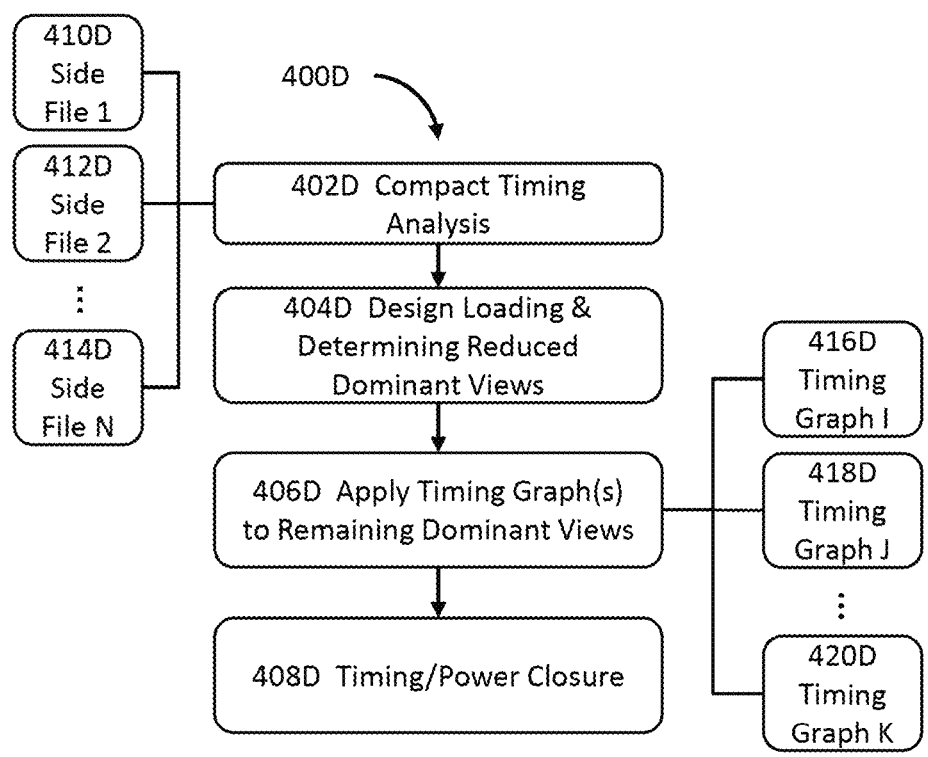

FIG. 4D illustrates a simplified block diagram 400D for implementing electronic design closure with reduction techniques in some embodiments. In these embodiments, a compact timing analysis may be performed at 402D to generate compact timing data (410D, 412D, or 414D, etc.) for each analysis view of a plurality of analysis views in a single-mode, single-corner analysis. The compact timing analysis may also generate a timing graph (e.g., 416D, 418D, or 420D, etc.), which contains much more detailed timing data and information than the corresponding compact timing data, for each of the plurality of analysis views.

The compact timing data may be loaded during the design loading stage at 404D. Unlike conventional approaches that load the timing graphs and thus require impractically larger memory footprint, various techniques load only the compact timing data for all of the plurality of analysis views at 404D and use the compact timing data to determine a reduced set of dominant views at 404D. In some embodiments, the respective timing graphs may be applied only to the reduced set of dominant views at 406D for a design closure engine to perform one or more design closure tasks (e.g., a timing closure task, a power closure task, etc.) at 408D. In some other embodiments, a design closure task may be performed with the entire set of analysis views and compact timing data for each of the entire set of analysis views.

System Architecture Overview

Figure 5:
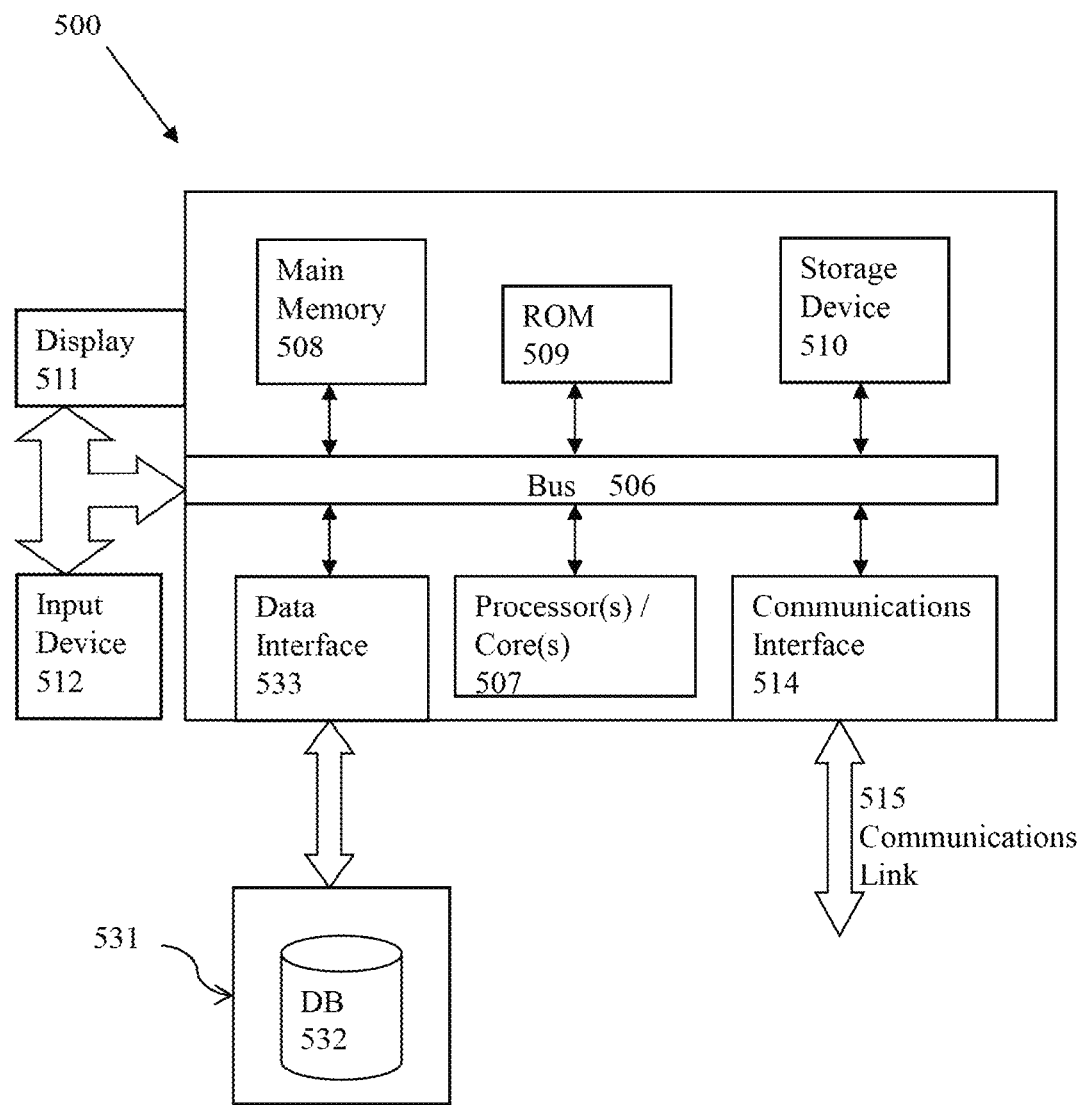
FIG. 5 illustrates a computerized system on which a process for implementing electronic design closure with reduction techniques may be implemented.

FIG. 5 illustrates a computerized system on which a method for implementing electronic design closure with reduction techniques may be implemented. Computer system 500 includes a bus 506 or other communication module for communicating information, which interconnects subsystems and devices, such as processor 507, system memory 508 (e.g., RAM), static storage device 509 (e.g., ROM), disk drive 510 (e.g., magnetic or optical), communication interface 514 (e.g., modem or Ethernet card), display 511 (e.g., CRT or LCD), input device 512 (e.g., keyboard), and cursor control (not shown).

The illustrative computing system 500 may include an Internet-based computing platform providing a shared pool of configurable computer processing resources (e.g., computer networks, servers, storage, applications, services, etc.) and data to other computers and devices in a ubiquitous, on-demand basis via the Internet in some embodiments. For example, the computing system 500 may include or may be a part of a cloud computing platform (e.g., a public cloud, a hybrid cloud, etc.) where computer system resources (e.g., storage resources, computing resource, etc.) are provided on an on-demand basis, without direct, active management by the users in some embodiments.

According to one embodiment, computer system 500 performs specific operations by one or more processor or processor cores 507 executing one or more sequences of one or more instructions contained in system memory 508. Such instructions may be read into system memory 508 from another computer readable/usable storage medium, such as static storage device 509 or disk drive 510. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 507, where the one or more processors, one or more processor cores, or combination thereof executes one or more threads. For example, the acts of determination, extraction, simulating, annotating, analyzing, optimizing, and/or identifying, etc. descried herein may be performed by one or more processors, one or more processor cores, or combination thereof.

The term "computer readable storage medium" or "computer usable storage medium" as used herein refers to any non-transitory medium that participates in providing instructions to processor 507 for execution. Such a medium may take many forms, including but not limited to, non-volatile media and volatile media. Non-volatile media includes, for example, optical or magnetic disks, such as disk drive 510. Volatile media includes dynamic memory, such as system memory 508. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 500. According to other embodiments of the invention, two or more computer systems 500 coupled by communication link 515 (e.g., LAN, PTSN, or wireless network) may perform the sequence of instructions required to practice the invention in coordination with one another.

Computer system 500 may transmit and receive messages, data, and instructions, including program (e.g., application code) through communication link 515 and communication interface 514. Received program code may be executed by processor 507 as it is received, and/or stored in disk drive 510, or other non-volatile storage for later execution. In an embodiment, the computer system 500 operates in conjunction with a data storage system 531, e.g., a data storage system 531 that includes a database 532 that is readily accessible by the computer system 500. The computer system 500 communicates with the data storage system 531 through a data interface 533. A data interface 533, which is coupled to the bus 506 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 533 may be performed by the communication interface 514.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

Various example embodiments of the invention are described herein. Reference is made to these examples in a non-limiting sense. The examples described herein are provided to illustrate more broadly applicable aspects of the invention. Various changes may be made to any of the examples or embodiments described herein, and equivalents thereof may be substituted without departing from the true spirit and scope of these examples or embodiments described herein.

In addition, many modifications may be made to adapt a particular situation, material, composition of matter, system, module, process, and/or process act(s) or step(s) to the objective(s), spirit or scope of the present disclosure. Further, as will be appreciated by those with skill in the art, each of the individual variations, examples, and/or embodiments, etc. described and illustrated herein has discrete components and features which may be readily separated from or combined with the feature or features of any of the other several variations, examples, and/or embodiments, etc., without departing from the scope or spirit of various variations, examples, and/or embodiments, etc. described herein. All such modifications are intended to be within the scope of claims associated with this disclosure. Moreover, various embodiments or portion(s) thereof described herein may be combined to provide further embodiments. Any aspects of the embodiments may be modified, if necessary, to employ concepts of the various variations, examples, and/or embodiments, etc. described herein to provide yet further embodiments.

We claim:

1. A computer implemented method for implementing electronic design closure with reduction techniques, comprising:
   determining a timing graph and compact timing data for respective analysis views of a set of analysis views of an electronic design;
   determining a reduced set of dominant analysis views based at least in part upon a result of performing a timing dominance analysis using at least the compact timing data for the respective analysis views;
   loading timing data for at least the reduced set of dominant analysis views; and
   performing a design closure task on the electronic design using at least the timing data and the reduced set of dominant analysis views.

2. The computer implemented method of claim 1, wherein determining the timing graph and the compact timing data comprises:
   identifying an analysis view for the electronic design; and
   generating the timing graph for an analysis view of the respective analysis views of at least by performing a timing analysis on the analysis view.

3. The computer implemented method of claim 2, wherein determining the timing graph and the compact timing data further comprises:
   identifying a point of interest along a timing path in the analysis view;
   determining a set of timing data pertaining to the point gf interest from the timing graph; and
   storing the set of timing data into the compact timing data for the analysis view.

4. The computer implemented method of claim 1, wherein determining the reduced set of dominant analysis views comprises:
   identifying a plurality of analysis views for the electronic design; and
   determining a set of dominance criteria for the set of analysis views.

5. The computer implemented method of claim 4, wherein determining the reduced set of dominant analysis views further comprises:
   performing a nested or hierarchical dominance analysis on the plurality of analysis views based at least in part upon the set of dominance criteria; and
   determining a dominant view from the plurality of analysis views based at least in part upon a result of the nest or hierarchical dominance analysis.

6. The computer implemented method of claim 5, wherein performing the nested or hierarchical dominance analysis comprises:
   identifying a first analysis view and a second analysis view from the set of analysis views, wherein the first has a first violation, and the second analysis view has a second violation; and
   determining whether the first and the second analysis views correspond to a same delay corner.

7. The computer implemented method of claim 6, wherein performing the nested or hierarchical dominance analysis further comprises:
   when the first and the second analysis views are determined to correspond to the same delay corner, performing a first set of acts that comprises:

determining whether first timing data for the first analysis view is worse than second timing data for a point of interest in the second analysis view;

determining the first analysis view to dominate over the second analysis view when the first timing data is determined to be worse than the second timing data; and determining the second analysis view to dominate over the first analysis view when the first timing data is determined to be better than the second timing data for the point of interest.

8. The computer implemented method of claim 7, wherein performing the nested or hierarchical dominance analysis further comprises:

identifying an operating characteristic for both the first and the second analysis views, where the operating characteristic comprises a primary voltage or a frequency; and determining a dominant view between the first and the second analysis views based at least in part upon the operating characteristic.

9. The computer implemented method of claim 6, wherein performing the nested or hierarchical dominance analysis further comprises:

when the first and the second analysis views are determined not to correspond to the same delay corner, performing a second set of acts that comprises:

determining whether the first and the second analysis views correspond to a same RC (resistance capacitance) time constant.

10. The computer implemented method of claim 9, wherein performing the nested or hierarchical dominance analysis further comprises:

determining that both the first and the second analysis views are dominant; and adding both the first and the second analysis views to the reduced set of dominant analysis views.

11. The computer implemented method of claim 6, wherein performing the nested or hierarchical dominance analysis further comprises:

when the first and the second analysis views are determined to correspond to the same delay corner, performing a second set of acts that comprises:

determining whether a first cell delay pertaining to a point of interest in the first analysis view is worse than a second cell delay in the second analysis view; and determining that the first analysis view dominates over the second analysis view when it is determined that the first cell delay is worse than the second cell delay.

12. The computer implemented method of claim 6, wherein performing the nested or hierarchical dominance analysis further comprises:

when the first and the second analysis views are determined to correspond to the same delay corner, performing a third set of acts that comprises:

identifying an operating characteristic pertaining to a point of interest for the first and the second analysis views; and determining a dominant view between the first and the second analysis views based at least in part upon the operating characteristic.

13. A computer program product comprising a non-transitory computer accessible medium storing thereupon a sequence of instructions which, when executed by a processor, causes the processor to perform a set of acts for implementing electronic design closure with reduction techniques, the set of acts comprising:

determining a timing graph and compact timing data for respective analysis views of a set of analysis views of an electronic design;

determining a reduced set of dominant analysis views based at least in part upon a result of performing a timing dominance analysis using at least the compact timing data for the respective analysis views;

loading timing data for at least the reduced set of dominant analysis views; and performing a design closure task on the electronic design using at least the timing data and the reduced set of dominant analysis views.

14. The computer program product of claim 13, wherein the set of acts further comprises:

identifying an analysis view for the electronic design;

generating the timing graph for an analysis view of the respective analysis views at least by performing a timing analysis on the analysis view;

identifying a point of interest along a timing path in the analysis view;

determining a set of timing data pertaining to the point gf interest from the timing graph; and storing the set of timing data into the compact timing data for the analysis view.

15. The computer program product of claim 13, wherein the set of acts further comprises:

identifying a plurality of analysis views for the electronic design;

determining a set of dominance criteria for the set of analysis views;

performing a nested or hierarchical dominance analysis on the plurality of analysis views based at least in part upon the set of dominance criteria; and determining a dominant view from the plurality of analysis views based at least in part upon a result of the nest or hierarchical dominance analysis.

16. The computer program product of claim 13, wherein the set of acts further comprises:

identifying a first analysis view and a second analysis view from the set of analysis views, wherein the first has a first violation, and the second analysis view has a second violation;

determining whether the first and the second analysis views correspond to a same delay corner; and when the first and the second analysis views are determined to correspond to the same delay corner, performing a first set of acts that comprises:

determining whether first timing data for the first analysis view is worse than second timing data for a point of interest in the second analysis view;

determining the first analysis view to dominate over the second analysis view when the first timing data is determined to be worse than the second timing data; and determining the second analysis view to dominate over the first analysis view when the first timing data is determined to be better than the second timing data for the point of interest.

17. A system for implementing electronic design closure with reduction techniques, comprising:

a processor; and a memory having stored thereupon a sequence of instructions of program code, which when executed by the processor, causes the processor to execute a set of acts, the set of acts comprising:

determining a timing graph and compact timing data for respective analysis views of a set of analysis views of an electronic design;

determining a reduced set of dominant analysis views based at least in part upon a result of performing a timing dominance analysis using at least the compact timing data for the respective analysis views;

loading timing data for at least the reduced set of dominant analysis views; and performing a design closure task on the electronic design using at least the timing data and the reduced set of dominant analysis views.

18. The system of claim 17, wherein the set of acts further comprises:

identifying an analysis view for the electronic design;

generating the timing graph for an analysis view of the respective analysis views at least by performing a timing analysis on the analysis view;

identifying a point of interest along a timing path in the analysis view;

determining a set of timing data pertaining to the point gf interest from the timing graph; and storing the set of timing data into the compact timing data for the analysis view.

19. The system of claim 17, wherein the set of acts further comprises:

identifying a plurality of analysis views for the electronic design;

determining a set of dominance criteria for the set of analysis views;

performing a nested or hierarchical dominance analysis on the plurality of analysis views based at least in part upon the set of dominance criteria;

determining a dominant view from the plurality of analysis views based at least in part upon a result of the nest or hierarchical dominance analysis;

identifying a first analysis view and a second analysis view from the set of analysis views, wherein the first has a first violation, and the second analysis view has a second violation; and determining whether the first and the second analysis views correspond to a same delay corner.

20. The system of claim 19, wherein the set of acts further comprises:

when the first and the second analysis views are determined not to correspond to the same delay corner, performing a second set of acts that comprises:

determining whether the first and the second analysis views correspond to a same RC (resistance capacitance) time constant;

determining that both the first and the second analysis views are dominant; and adding both the first and the second analysis views to the reduced set of dominant analysis views; and when the first and the second analysis views are determined to correspond to the same delay corner, performing a second set of acts that comprises:

determining whether a first cell delay pertaining to a point of interest in the first analysis view is worse than a second cell delay in the second analysis view; and determining that the first analysis view dominates over the second analysis view when it is determined that the first cell delay is worse than the second cell delay.

* * * * *